United States Patent
Wang et al.

(10) Patent No.: US 9,680,944 B2
(45) Date of Patent: Jun. 13, 2017

(54) METHOD AND SYSTEM FOR LOADING CONTENT DATA ON A WEBPAGE

(71) Applicant: Disney Enterprises, Inc., Burbank, CA (US)

(72) Inventors: Yuan Wang, Walnut, CA (US); Innate Mak, Chino Hills, CA (US); Wen Qu, Monterey Park, CA (US); Jiancheng Ma, Hacienda Heights, CA (US)

(73) Assignee: Disney Enterprises, Inc., Burbank, CA (US)

( * ) Notice: Subject to any disclaimer, the term of this patent is extended or adjusted under 35 U.S.C. 154(b) by 352 days.

(21) Appl. No.: 14/161,459

(22) Filed: Jan. 22, 2014

(65) Prior Publication Data

US 2015/0095408 A1 Apr. 2, 2015

Related U.S. Application Data (60) Provisional application No. 61/883,767, filed on Sep. 27, 2013.

(51) Int. Cl.
| | | |
|---|---|---|
| *G06F 15/16* | (2006.01) | |
| *H04L 29/08* | (2006.01) | |
| *G06Q 30/02* | (2012.01) | |
| *H04N 1/00* | (2006.01) | |

(52) U.S. Cl.
CPC ......... *H04L 67/22* (2013.01); *G06Q 30/0271* (2013.01); *H04L 67/02* (2013.01); *H04L 29/08* (2013.01); *H04N 1/00461* (2013.01)

(58) Field of Classification Search
None
See application file for complete search history.

(56) References Cited

U.S. PATENT DOCUMENTS

| | | | | |
|---|---|---|---|---|
| 5,862,347 A | * | 1/1999 | Suzuki | .................... H04L 67/06 709/247 |
| 7,685,191 B1 | | 3/2010 | Zwicky | |
| 8,180,376 B1 | * | 5/2012 | Merritt | .................. H04W 24/10 455/456.2 |
| 8,365,062 B2 | | 1/2013 | Seolas | |
| 9,203,908 B2 | | 12/2015 | Wogulis | |
| 2004/0015580 A1 | | 1/2004 | Lu | |
| 2005/0240599 A1 | | 10/2005 | Sears | |
| 2007/0075915 A1 | * | 4/2007 | Cheon | .................. G06F 1/1616 345/1.1 |
| 2009/0094638 A1 | | 4/2009 | Brier | |

(Continued)

*Primary Examiner* — Viet Vu
*Assistant Examiner* — James Edwards
(74) *Attorney, Agent, or Firm* — Farjami & Farjami LLP (57) ABSTRACT

There is provided a system and method for optimizing loading of content data on a webpage by utilizing client-side technology. The system comprising a server and a client device, the client device configured to request a webpage from a server, receive an image tag and a configuration file from the server, determine a selected image from a plurality of images using client capabilities, the image tag, and the configuration file, create an image handle to request the selected image from the server, transmit the image handle to the server, and receive the selected image from the server. The client device may also receive supported advertisements from the server, select at least one advertisement from the supported advertisements using the client capabilities, and request the at least one advertisement from the server.

18 Claims, 5 Drawing Sheets

(56) References Cited

U.S. PATENT DOCUMENTS

| | | |
|---|---|---|
| 2009/0241016 A1 | 9/2009 | Kihara |
| 2010/0064234 A1 | 3/2010 | Schreiber |
| 2011/0016197 A1 | 1/2011 | Shiimori |
| 2011/0268185 A1* | 11/2011 | Watanabe .......... H04N 21/2343 375/240.03 |
| 2011/0271175 A1 | 11/2011 | Lavi |
| 2012/0054815 A1* | 3/2012 | Ushimaru .......... H04N 21/4622 725/112 |
| 2012/0159307 A1* | 6/2012 | Chung .............. G06F 17/30905 715/234 |
| 2012/0311091 A1* | 12/2012 | Dingler ................ H04L 63/10 709/219 |
| 2013/0031464 A1* | 1/2013 | Mess ................ G06F 17/30905 715/234 |
| 2013/0138506 A1 | 5/2013 | Zhu |

* cited by examiner

METHOD AND SYSTEM FOR LOADING CONTENT DATA ON A WEBPAGE

RELATED APPLICATION(S)

The present application claims the benefit of and priority to a U.S. Provisional Patent Application Ser. No. 61/883,767, filed Sep. 27, 2013 and titled "Optimizing Loading of Content Data on a Webpage by Utilizing Client-Side Technology," which is hereby incorporated by reference in its entirety into the present application.

BACKGROUND

Current technology allows webpages to be loaded on a variety of devices including computers, cell phones, tablets, and televisions. These webpages contain a wide assortment of webpage content including images and advertisements. However, problems can arise when the webpage content is being loaded on some of these devices. Such problems can include a device trying to load images or advertisements that are not compatible with the particular device, or loading images and advertisements that are not optimal for the particular device. These problems can cause a real inconvenience to users of these devices, as the users are not able to experience everything that the webpage has to offer. Furthermore, advertisers using these webpages to advertise their products may not be able to provide users of certain devices with the advertisements they have paid these webpages to provide.

SUMMARY

The present disclosure is directed to method and system for loading content data on a webpage, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
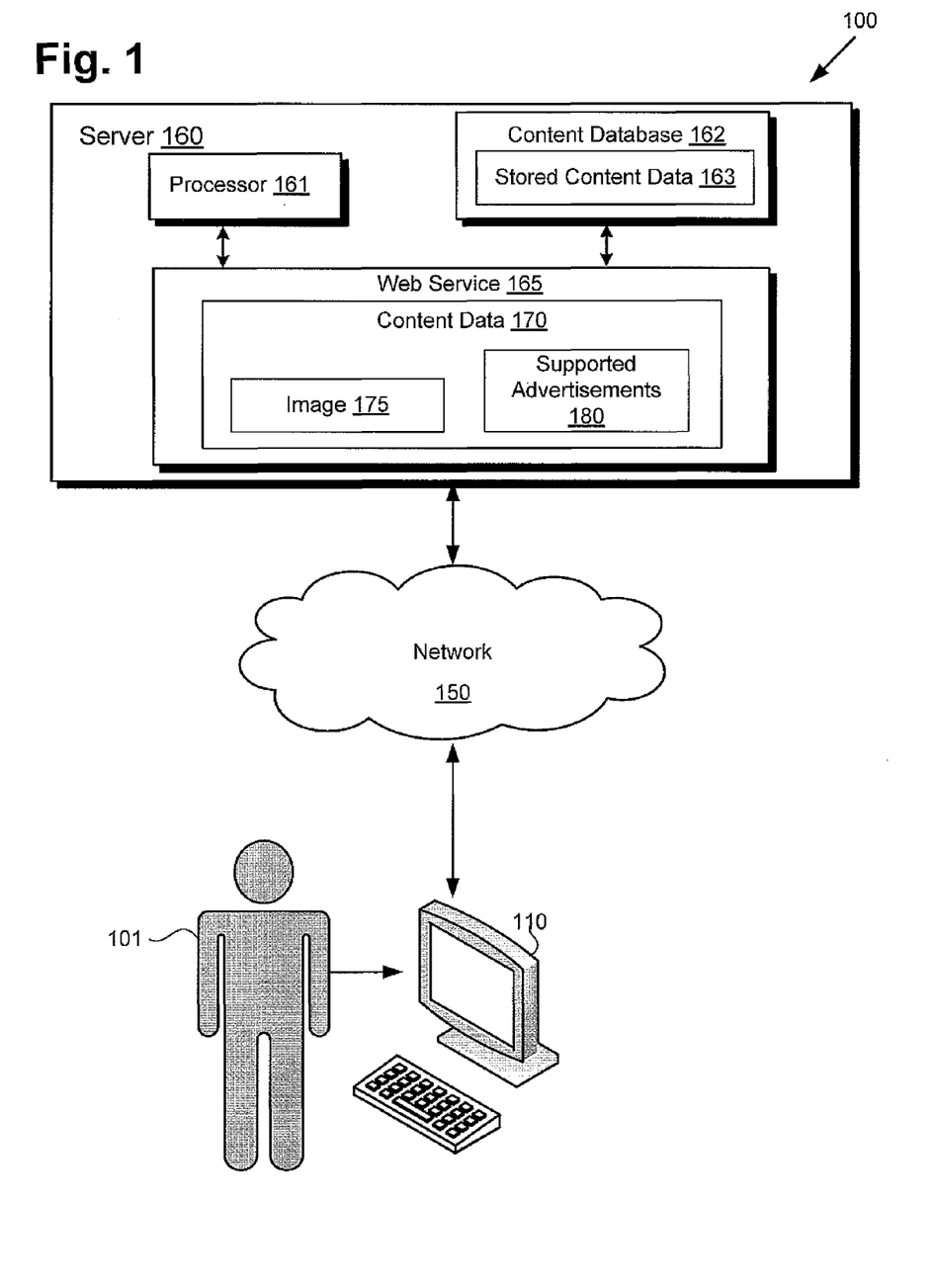
FIG. 1 presents a system for accessing web content over a network, according to one implementation of the present disclosure.

FIG. 1 presents a system for accessing web content over a network, according to one implementation of the present disclosure. System 100 includes user 101, client device 110, network 150, and server 160. Server 160 includes processor 161, content database 162, and web service 165. Web service 165 includes content data 170, which includes image 175 and supported advertisements 180. Content database 162 includes stored content data 163.

It is noted that although client device 110 is represented as a personal computer (PC) in FIG. 1, in other implementations, client device 110 may include another type of mobile or stationary personal communication device or system, such as a tablet computer, mobile telephone, personal digital assistant (PDA), gaming console, or home entertainment system, for example.

As illustrated in FIG. 1, server 160 includes processor 161, content database 162, and web service 165. Processor 161 may be configured to access content database 162 to store received input or to execute commands, processes, or programs associated with web service 165. Processor 161 may correspond to a processing device, such as a microprocessor or similar hardware processing device, or a plurality of hardware devices. For example, processor 161 may correspond to an Intel processor or an AMD processor. However, in other implementations processor 161 refers to a general processor capable of performing the functions required of server 160.

According the implementation of FIG. 1, user 101 may utilize client device 110 and network 150 to access web service 165 of server 160. Web service 165 may include a website or webpage controlled and provided by server 160. As shown in FIG. 1, web service 165 includes content data 170, which includes both image 175 and supported advertisements 180. However, the implementation of FIG. 1 is not limited to content data 170 only including image 175 and supported advertisements 180. In other implementations, content data 170 may include, but is not limited to, an advertisement, image, text, video, link, game, or application.

As shown in FIG. 1, web service 165 may be accessed through network 150. Alternatively, web service 165 may reside on a server supporting a local area network (LAN), or be included in another type of limited distribution network. In another implementation, web service 165 may be stored in a non-transitory storage device, e.g. a computer-readable storage medium such as a computer hard-drive, random-access memory (RAM), or a portable memory device such as a compact disc read-only memory (CD-ROM) or external Universal Serial Bus (USB) connected memory, for example.

As further shown in FIG. 1, web service 165 may access content database 162, which may include stored content data 163. Like content data 170 discussed above, stored content data 163 may include, but is not limited to, an advertisement, image, text, video, link, game, or application. Web service 165 may then utilize stored content data 163 in content database 162 and provide stored content data 163 with web service 165. For example, stored content data 163 may include advertisements and web service 165 may access the advertisements in stored content database 162. Web service 165 may then provide the advertisements with a webpage being accessed by user 101 of client device 110.

It should be noted that in the implementation of FIG. 1, server 160 includes both content database 162 and web service 165, however, the implementation of FIG. 1 is not limiting to server including both content database 162 and web service 165. In other implementations, either content database 162 or web service 165 may be stored on a second server separate from server 160, which server 160 can access through network 150. For example, if content database 162 is stored on a second server separate from server 160, server 160 would be able to access content database 162 on the second server through network 150.

Figure 2:
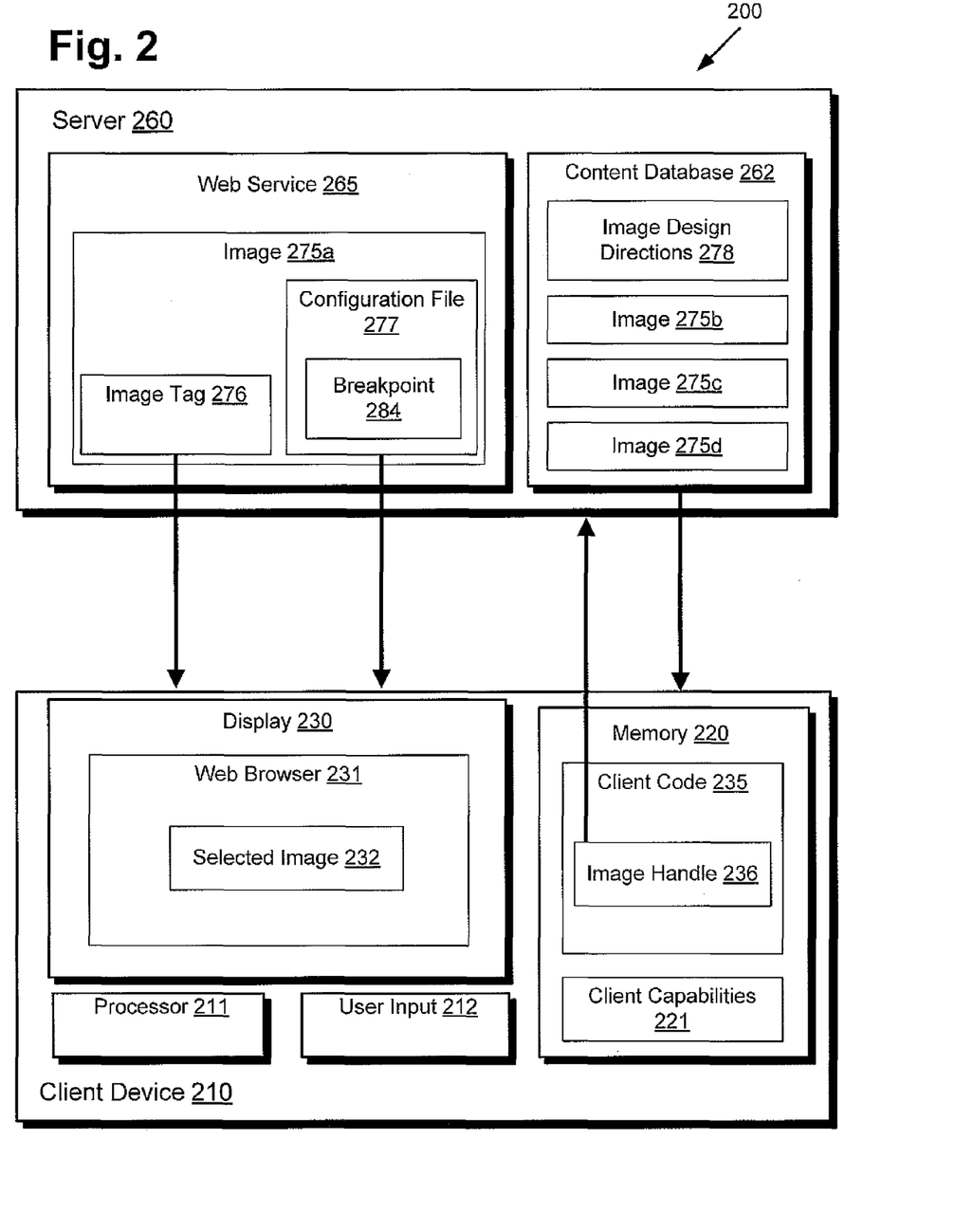
FIG. 2 presents a system for client-side image selection, according to one implementation of the present disclosure.

FIG. 2 presents a system for client-side image selection, according to one implementation of the present disclosure. System 200 includes client device 210 and server 260. Client device 210 includes processor 211, user input 212, memory 220, and display 230. Memory 220 includes client capabilities 221 and client code 235, which includes image handle 236. Display 230 includes web browser 231, which includes selected image 232. Server 260 includes content database 262 and web service 265. Content database 262 includes image 275*b*, image 275*c*, image 275*d*, and image design directions 278. Web service 265 includes image 275*a*. Image 275*a* includes image tag 276 and configuration file 277. Configuration file 277 includes breakpoint 284. With regards to FIG. 2, it should be noted that client device 210, server 260, content database 262, web service 265, and image 275*a* correspond respectively to client device 110, server 160, content database 162, web service 165, and image 175 from FIG. 1. Additionally, network 150 and processor 161 have been removed from FIG. 2 for clarity purposes.

As shown in FIG. 2, client device 210 includes display 230 and user input 212. User input 212 may include, for example, a keyboard, a mouse, a game controller, a touch-screen input, a thermal and/or electrical sensor, or any other device capable of accepting user input for use with client device 210. Display 230 may comprise a liquid crystal display (LCD) screen built into client device 210. In alternative implementations of the present disclosure, display 230 may be another type of display hardware, such as cathode-ray tubes (CRT) monitors. In yet other implementations, display 230 may also be touch sensitive and may serve as user input 212. Moreover, display 230 and user input 212 may be externally attached to client device 210 through physical or wireless connection.

Client device 210 further includes processor 211 and memory 220. Processor 211 may be configured to access memory 220 to store received input or to execute commands, processes, or programs stored in memory 220, such as client code 235. Processor 211 may correspond to a processing device, such as a microprocessor or similar hardware processing device, or a plurality of hardware devices. However, in other implementations processor 211 refers to a general processor capable of performing the functions required of client device 210. Memory 220 is a sufficient memory capable of storing commands, processes, and programs for execution by processor 211. Memory 220 may be instituted as ROM, RAM, flash memory, or any sufficient memory capable of storing a set of commands. In other implementations, memory 220 may correspond to a plurality memory types or modules. Memory 220 may also be protected to prevent outside manipulation of memory 220 or specific portions of memory 220.

Memory 220 of client device 210 includes client capabilities 221 and client code 235. Client capabilities 221 can include, but are not limited to, the type of client device, the screen size of display 230, the orientation of display 230, the resolution of display 230, the color space display 230 can handle, the storage space of client device 210, the available memory of client device 210, and the bandwidth capabilities of client device 210. Client code 235 can be executed by processor 211 of client device 210 to determine client capabilities 221 and create image handle 236. Image handle 236 is used to receive selected image 232, as described in more detail below.

Also illustrated in FIG. 2 is content database 262 on server 260. Content database 262 includes image 275*b*, image 275*c*, image 275*d*, and image design directions 278. In the implementation of FIG. 2, each of images 275*b-d* corresponds to image 275*a*, except that images 275*b-d* are saved in content database 262 in a different size and/or resolution as image 275*a*. For example, image 275*a* may be an image of a flower while images 275*b-d* may be images of the same flower, but with image 275*a* designed for a mobile phone, image 275*b* designed for a tablet, image 275*c* designed for a computer, and image 275*d* designed for a television. As such, server 260 is able to transmit an image file to client device 210 that more closely matches the capabilities of client device 210, such as by using client capabilities 221.

Image design directions 278 specify how a crop ratio of an image can be changed and where the center point of the crop is located. This gives system 260 the ability to focus on a specific region of an image. For example, system 260 might use image design directions 278 to specify image thumbnails for images 275*a-275d*. Design directions 278 might change from image to image. For example, even though image 275*a* and image 275*b* might include a similar image, image design directions 278 might impact the crop ration and center point of the crop for image 275*a* differently that the crop ration and center point of the crop for image 275*b*. System 260 can thus use image design directions 278 to create specific images for various client devices. For example, the crop ratio and center of the crop for image 275*a* might be designed specifically for a mobile phone, while the crop ratio and center of the crop for image 275*b* might be designed specifically for a tablet.

In the implementation of FIG. 2, client device 210 is executing web browser 231 to access web service 265 of server 260 over a network, such as network 150 of FIG. 1. Web service 265 may include a webpage or website hosted by server 260. In response to client device 210 accessing web service 265, client device 210 receives image tag 276 and configuration file 277 of image 275*a* from server 260. Image tag 276 includes a reference to a transparent place image holder and data according to the real image. For example, a webpage might include ten different images. The transparent place image holder will include one thumbnail for all ten images sized to the same ratio, and this one thumbnail will be sent to the client device. This way only one thumbnail image is sent to client device 210 instead of ten separate thumbnail images. However, the illustration of FIG. 2 only includes one image, image 275*a*, for clarity purposes. The data according to the real image includes data properties needed to transport the transparent image into the real image.

Configuration file 277 allows for the image sizing and design direction to be controlled on a per page, module, breakpoint, and image direction basis. As illustrated in FIG. 2, configuration file 277 includes breakpoint 284. Breakpoint 284 may specify a range of screen sizes that are supported for each type of client device. For example, breakpoint 284 might specify that image 275*a* is supported by client devices with a screen size range that matches mobile phones, while image 275*b* is supported by client devices with a screen size range that matches tablets. Client device 210 can then utilize breakpoint 284 when determining which image to request. For example, if client device 210 is a mobile phone with a screen size of (480×320), then client device 210 can utilize breakpoint 284 and determine that a screen size of (480×320) falls within the screen size range for mobile phones. Client device 210 would then make a request for image 275a. For another example, if client device 210 is a tablet with a screen size of (1024×768), then client device 210 can utilize breakpoint 284 and determine that a screen size of (1024×768) falls within the screen size range for tablets. Client device 210 would then make a request for image 275b.

After client device 210 receives image tag 275 and configuration file 277 from server 260, processor 211 of client device 210 executes client code 235 in memory 220 to utilize image tag 275, configuration file 277, and client capabilities 221 in order to select a proper image for client device 210, such as selected image 232. For example, client code 235 may use client capabilities 221, such as the size of display 230, how large of an image is desired, whether retina is supported by display 230, and the bandwidth of client device 210, along with image tag 275 and configuration file 277 to determine the proper image file to request from server 260. Next, client code 235 creates image handle 236 to request the proper image file from server 260, and transmits image handle 236 to server 260. Finally, client device 210 receives the proper image file from server 260 and loads the proper image file into web browser 231 as selected image 232.

In the example described above, selected image 232 may correspond to any one of images 275a-d located on server 260. As described above, each of images 275a-d may correspond to the same image, such as an image of a flower, but each of images 275a-d may include an image file for a different size and/or resolution of the image. Once client device 210 determines the proper image size and/or resolution for selected image 232, client device 210 requests the image file from server 260, which may be one of images 275a-d. This way server 260 does not send client device 210 an image that is too big for display 230, or an image that includes an image ratio that does not accommodate the configuration of display 230. A user of client device 210 is thus receiving the perfect image to accommodate the capabilities of client device 210.

It should be noted that in the implementation of FIG. 2, server 260 only includes four image files corresponding to the same image, however, this implementation is for clarity purposes only and is not limiting. In another implementation, server 260 may include any number of image files corresponding to any number of images on a webpage. For example, server 260 may include one hundred image files that depict twenty-five different images that are to be displayed on a webpage. In such example, each of the twenty-five different images would have four image files, with each saved as a different size and/or resolution image file. Server 260 would then send client device 210 a configuration file, and one image tag that includes all twenty-five images. Client device 210 would then utilize client capabilities, the image file, and the configuration file to select and request one image file for each of the twenty-five displayed images on the webpage.

Figure 3:
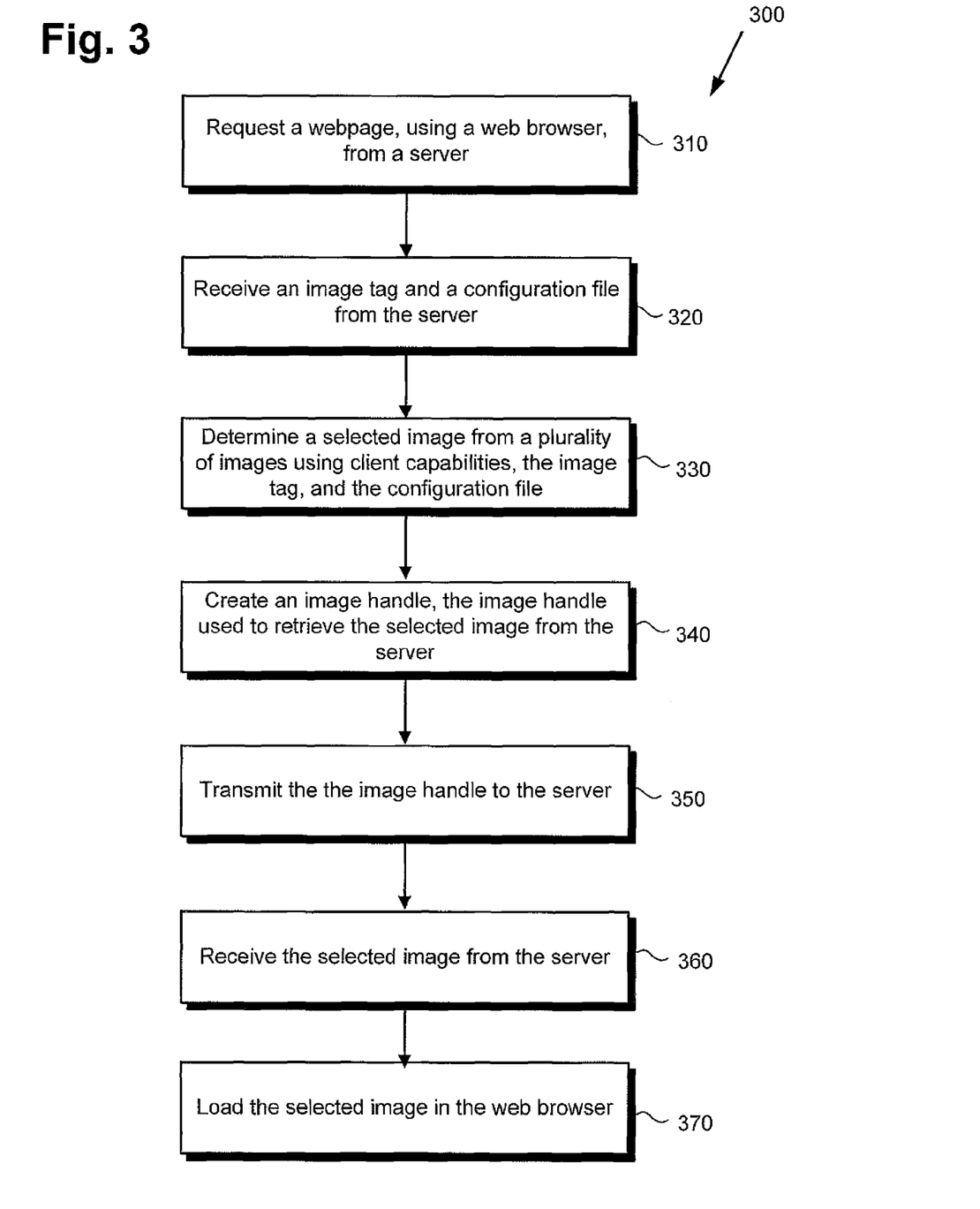
FIG. 3 presents a flowchart illustrating a method for client-side image selection, according to one implementation of the present disclosure.

FIG. 3 presents a flowchart illustrating a method for client-side image selection, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 2, the disclosed inventive concepts are not intended to be limited by specific features shown and described with respect to FIG. 2. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 includes requesting a webpage, using a web browser, from a server (310). For example, processor 211 of client device 210 can execute web browser 231 to access web service 265 of server 260 over a network, such as network 150 of FIG. 1. As discussed above, web service 265 may include a webpage hosted and controlled by server 260. The webpage might include image 275a, which includes image tag 276 and configuration file 277.

Flowchart 300 also includes receiving an image tag and a configuration file from the server (320). For example, in response to client device 210 requesting the webpage from server 260, processor 211 of client device 210 may receive image tag 276 and configuration file 277 of image 275a from server 260. As discussed above, image tag 276 may include a reference to a transparent place image holder and data according to the real image. Configuration file 277 may include data describing how to use the real image in various scenarios.

Flowchart 300 also includes determining a selected image from a plurality of images using client capabilities, the image tag, and the configuration file (330). For example, processor 211 of client device 210 may execute client code 235 in memory 220 in order to utilize client capabilities 221, image tag 276, and configuration file 277 to select a proper image file, such as selected image 232. As discussed above, server 260 includes images 275a-d. Each of images 275a-d may depict the same image, such as an image of a flower, but each of images 275a-d may be stored on server 260 as an image file with a unique size and/or resolution image. Client device 210 may then select a proper image file from images 275a-d that best accommodates client capabilities 221, by utilizing the size, resolution, and configuration of display 230, along with the available bandwidth of client device 210.

Furthermore, in one implementation, client device 210 may utilize image design directions 278 when determining the selected image to request. In such implementations, server 260 will send image design directions 278 to client device 210 along with image tag 276 and configuration file 277. Client device 210 will then further utilize image design directions 278, along with image tag 276, configuration file 277, and client capabilities 221, to determine the selected image.

Flowchart 300 also includes creating an image handle, the image handle used to retrieve the selected image from the server (340). For example, after client code 235 determines selected image 232 from the plurality of images on server 260, processor 211 of client device 210 executes client code 235 to create image handle 236. Image handle 236 is used by client device 210 to request selected image 232 from server 260. As discussed above, selected image 232 may correspond to one of images 275a-d on server 260. As such, client device 210 can select selected image 232 from server 260, where selected image 232 is the proper image when considering the capabilities of client device 210.

Flowchart 300 also includes transmitting the image handle to the server (350) and receiving the selected image from the server (360). For example, processor 211 of client device 210 may transmit image handle 236 to server 260 over a network, such as network 150 from FIG. 1. Server 260 may then search through images 275-*d* and select the image that corresponds to selected image 232. Sever 260 then transmits selected image 232 to client device 210, and processor 211 of client device 210 receives selected image 232. Finally, flowchart 300 includes loading the selected image in the web browser (370). For example, processor 211 of client device 210 may load selected image 232 in web browser 231.

It is noted that although flowchart 300 only illustrates one occurrence of a client device selecting an image from a server, the disclosure is not limited to only one occurrence. For example, if a user of client device 210 alters client capabilities 221 by changing the screen size of display 230, such as by rotating client device 210 or varying the size of the browser in display 230, client device 210 will perform the method of flowchart 300 once again using the new screen size. For example, if the screen size on client device 210 changes, such as by the user of client device 210 tilting display 230 to give display 230 a new configuration, client device 210 will determine a second selected image from the plurality of images using this second configuration, create a second image handle to request the second selected image, transmit the second image handle to the server, receive the second selected image, and load the second selected image in the web browser.

Figure 4:
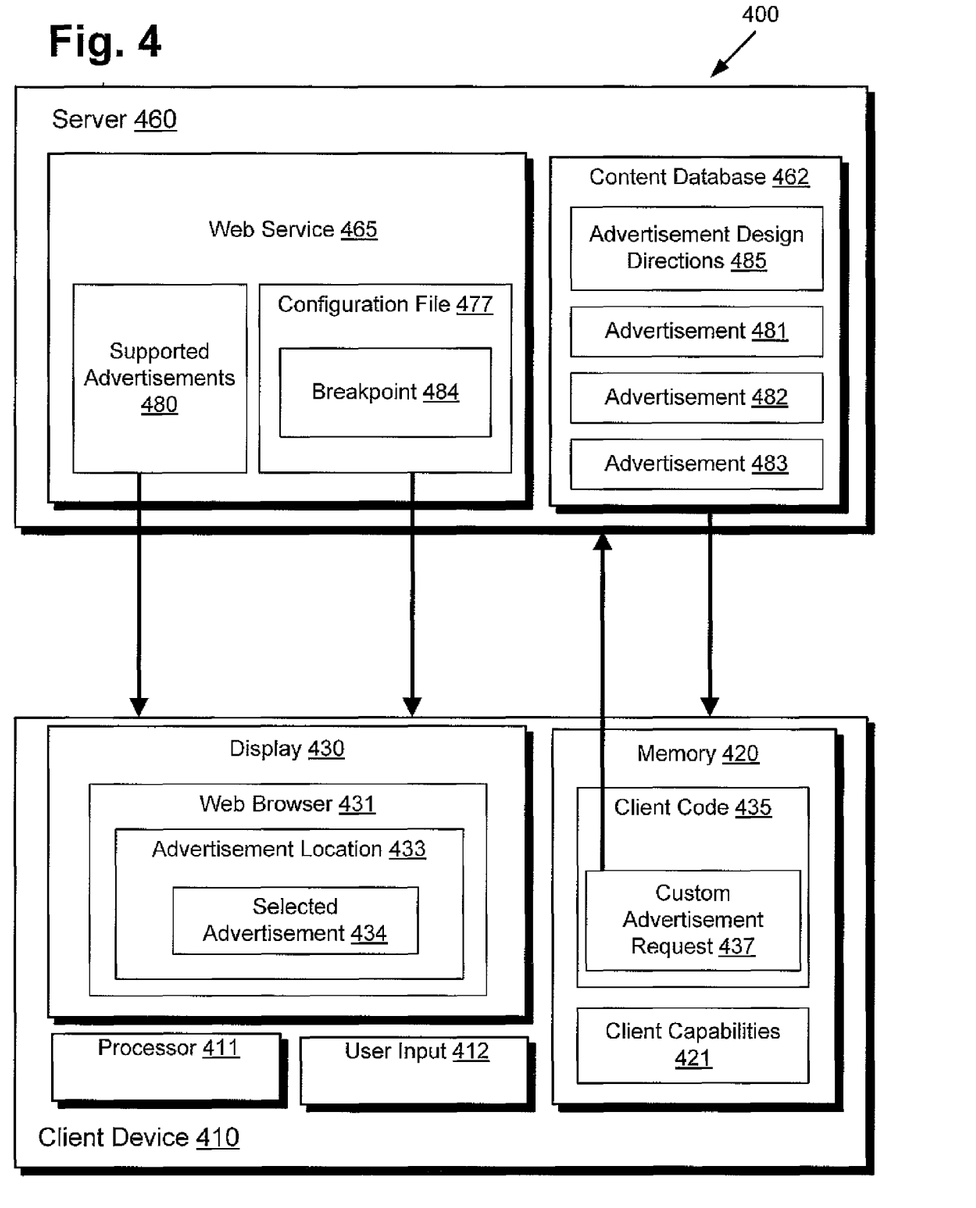
FIG. 4 present a system for client-side advertisement selection, according to one implementation of the present disclosure.

FIG. 4 presents a system for client-side advertisement selection, according to one implementation of the present disclosure. System 400 includes client device 410 and server 460. Client device 410 includes processor 411, user input 412, memory 420, and display 430. Memory 420 includes client capabilities 421 and client code 435, which includes custom advertisement request 437. Display 430 includes web browser 431. Web browser 431 includes advertisement location 433, which includes selected advertisement 434. Server 460 includes content database 462 and web service 465. Content database 462 includes advertisement 481, advertisement 482, advertisement 483, and advertisement design directions 485. Web service 465 includes supported advertisements 480 and configuration file 477. Configuration file 477 includes breakpoint 484.

With regards to FIG. 4, it should be noted that client device 410, server 460, content database 462, web service 465, and supported advertisements 480 correspond respectively with client device 110, server 160, content database 162, web service 165, and supported advertisements 180 of FIG. 1. It should further be noted that client device 410, processor 411, user input 412, memory 420, client capabilities 421, display 430, web browser 431, client code 435, server 460, content database 462, web service 465, and breakpoint 484 correspond respectively to client device 210, processor 211, user input 212, memory 220, client capabilities 221, display 230, web browser 231, client code 235, server 260, content database 262, web service 265, and breakpoint 284 of FIG. 2. Additionally, network 150 and processor 161 have been removed from FIG. 4 for clarity purposes.

As illustrated in FIG. 4, web service 465 includes supported advertisements 480 and configuration file 477. Supported advertisements 480 includes all of the advertisement units that a webpage displayed on a client device can support at all client device configurations. For example, supported advertisements 480 might include advertisement 481, advertisement 482, and advertisement 483 from content database 462. Server 460 may then identify and aggregate advertisements 481-483, and send the identities of advertisements 481-483 to client device 410 as supported advertisements 480.

It should be noted that the present disclosure is not limited to supported advertisements 480 including only three advertisements from content database 462. In other implementations, supported advertisements 480 might include the identity of any number of advertisements, such as one advertisement or fifty advertisements. It is also noted that in one implementation, each of advertisements 481-483 might include the same advertisement unit, but with each of advertisements 481-483 targeted towards a specific screen size and/or resolution for a display of a client device. Furthermore, in another implementation, each of advertisements 481-483 may include different advertising units. For example, advertisement 481 may be an advertisement for a car, advertisement 482 may be an advertisement for clothing, and advertisement 483 may be an advertisement for a tropical vacation spot.

It should further be noted that supported advertisements 480 may include advertisements other than the advertisements stored in content database 462 of server 460. For example, in one implementation, advertisements may be stored on other servers other than server 460. In such an example, supported advertisements 480 may then include the identity of the advertisements stored on these other servers.

Also illustrated in FIG. 4 is configuration file 477, which includes breakpoint 484. Breakpoint 484 sets a range of screen sizes that can support each of the advertisements in supported advertisements 480, such as advertisements 481-483. For example, breakpoint 484 might specify that advertisement 481 can only be displayed on a mobile phone, while advertisement 482 can only be displayed on a tablet. Breakpoint 484 also includes a range of screen sizes to classify client devices as mobile phones or tablets. For example, a client device with a screen size of (480×320), which is a normal screen size for a mobile phone and would fall within the range of screen sizes of mobile phones, can properly request advertisement 481. Furthermore, a client device with a screen size of (1024×768), which is a normal screen size of a tablet and would fall within the range of screen sizes for tablets, can properly request advertisement 482. This makes it easy for a client device, such as client device 410, to determine which advertisements to request by using the screen size for the client device display, such as display 430.

It should be noted that breakpoint 484 is not just limited to specifying ranges of screen sizes for mobile phones and tablets. Breakpoint 484 may also specify screen size ranges for other client devices, such as computers or televisions. Furthermore, some advertisements might fall into more than one range and thus would be specified for more than one device. For example, advertisement 483 might be properly displayed on both a mobile phone and a tablet.

Also illustrated in FIG. 4 is advertisement design directions 485. Advertisement design directions 485 specify how an advertisement is to be used on a webpage. For example, advertisement design directions 485 might specify that an advertisement from supported advertisements 480 can only be displayed if there is room at the top of a webpage, such as in the banner. For another example, advertisement design directions 485 might specify that an advertisement can only be displayed at the bottom of the webpage if the screen size of a client device meets a certain size requirement.

Also illustrated in FIG. 4 is selected advertisement 434 on client device 410. Selected advertisement 434 corresponds to the advertisement that client device 410 selects from supported advertisements 480. For example, if client device 410 determines that advertisement 481 from supported advertisements 480 is supported by display 430, then client device 410 will make a request for advertisement 481. In this example, advertisement 481 would correspond to selected advertisement 434.

In the implementation of FIG. 4, client device 410 is executing web browser 431 to access web service 465 of server 460 over a network, such as network 150 in FIG. 1. Web service 465 might include a webpage or website hosted by server 460. In response to client device 410 accessing web service 465, client device 410 receives supported advertisements 480 from server 460. As discussed above, supported advertisements 480 includes all the advertisement units that can be supported by a webpage on a client device using any client device configuration. For example, supported advertisements 480 may include advertisements 481-483.

As further illustrated in the implementation FIG. 4, client device 410 receives configuration file 477 from server 460, where configuration file 477 includes breakpoint 484. As discussed above, breakpoint 484 specifies screen size ranges for each type of client device, and which advertisements from supported advertisements 480 fall within those ranges. For example, and sticking with the example of supported advertisements including advertisements 481-483, breakpoint 484 might specify that that advertisement 481 can only be used on client devices with a screen size that falls within the screen size range of a mobile phone, while advertisement 482 can only be used on client devices with a screen size that falls within the screen size range of a tablet. If client device 410 has a screen size of (480×320), such as for a mobile phone, breakpoint 484 specifies that client device 410 can support advertisement 481.

Continuing with the implementation of FIG. 4, after client device 410 receives supported advertisements 480 and configuration file 477, client device 410 determines which advertisements from supported advertisements 480 are supported by display 430, and creates custom advertisement request 437 to request the supported advertisements. Custom advertisement request 437 requests any advertisement from supported advertisements 480 that can be supported on the webpage being displayed on display 430. For example, and sticking with the examples used above, if client device 410 determines that the screen size of display 430 is (480×320) and that advertisement 481 is supported on mobile phones, then client device 410 will create custom advertisement request 437 to request advertisement 481 from server 480.

Also illustrated in the implementation of FIG. 4, client device 410 transmits custom advertisement request 437 to server 460. After client device 410 has determined which advertisements from supported advertisements 480 to request and has created custom advertisement request 437, client device transmits custom advertisement request 437 to server 460. Next, the requested advertisements are then written onto the webpage. Finally, after the requested advertisements are written on the webpage, client code 435 searches for the proper location to place the requested advertisements. For example, as illustrated in FIG. 4, selected advertisement 434 was placed at advertisement location 433 within web browser 431.

As discussed above and illustrated in the implementation of FIG. 4, server 460 includes content database 462 and web service 465. However, the implementation of FIG. 4 is not limited to both content database 462 and web service 465 being located on server 460. In another implementation, content database 462 may be located on a separate server than server 460. In such an implementation, client device 410 would send custom advertisement request 437 to the separate server and receive selected advertisement 434 from the separate server.

Figure 5:
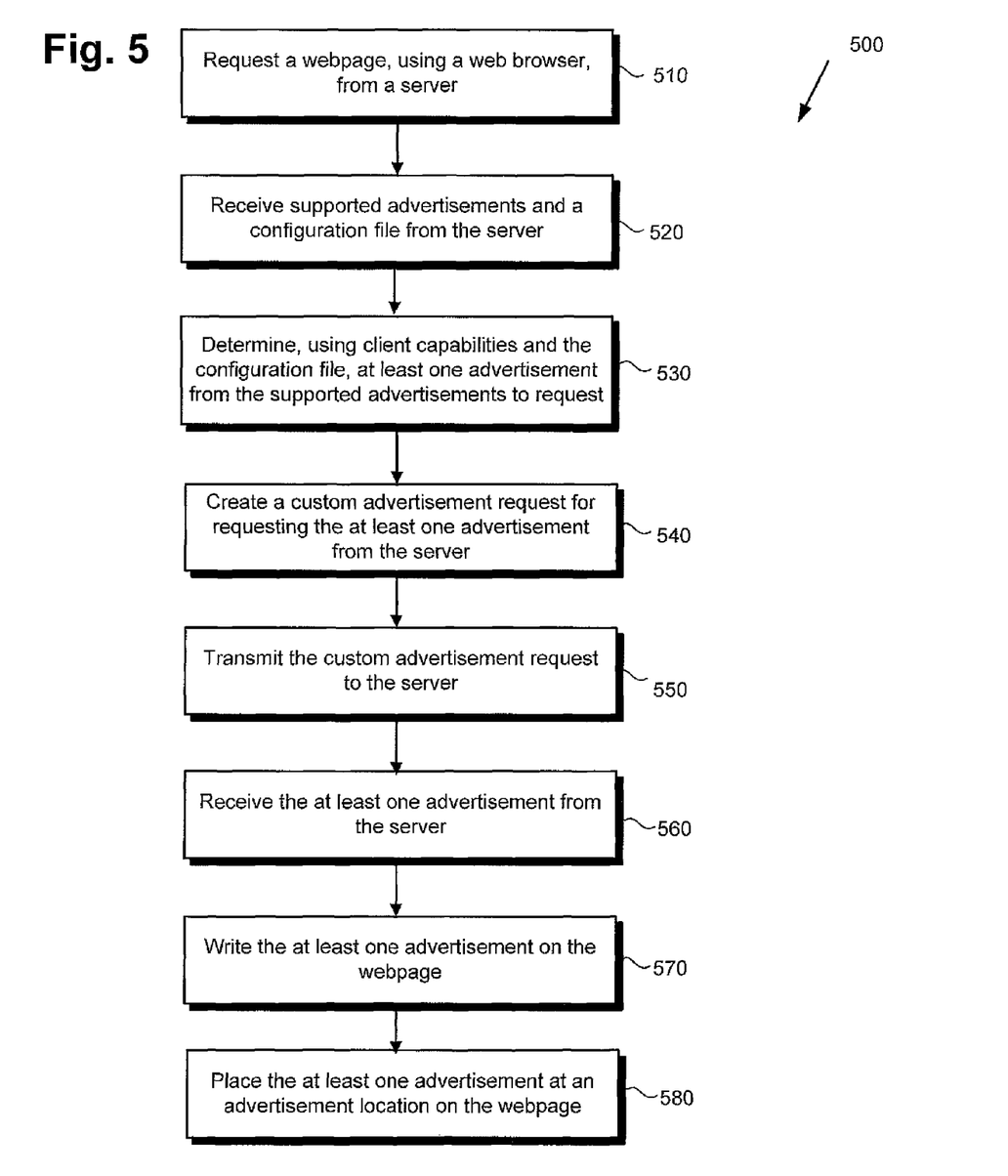
FIG. 5 presents a flowchart illustrating a method for client-side advertisement selection, according to one implementation of the present disclosure.

FIG. 5 presents a flowchart illustrating a method for client-side advertisement selection, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 4, the disclosed inventive concepts are not intended to be limited by specific features shown and described with respect to FIG. 4. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 includes requesting a webpage, using a web browser, from a server (510). For example, processor 411 of client device 410 can execute web browser 431 to access web service 465 of server 460 over a network, such as network 150 of FIG. 1. As discussed above, web service 465 may include a webpage hosted and controlled by server 460. The webpage might include advertisements, such as any of advertisements 481-483.

Flowchart 500 also includes receiving supported advertisements and a configuration file from the server (520). For example, processor 411 of client device 410 can receive supported advertisements 480 and configuration file 477 from server 460 in response to requesting the webpage. As discussed above, supported advertisements 480 includes the identity of all the advertisement units that the webpage displayed on a client device can support at all client device configurations. In the implementation of FIG. 4, supported advertisements 480 might include the identities of advertisements 481-483 from content database 462. However, in other implementations, supported advertisements 480 may include more or less advertisements. Furthermore, in one implementation, each of advertisements 481-483 may consist of the same advertising unit, but tailored towards a specific screen size and/or screen resolution. In other implementations, advertisements 481-483 may consist of different advertisements from different advertisers. For example, advertisement 481 may be an advertisement for a car, advertisement 482 may be an advertisement for clothing, and advertisement 483 may be an advertisement for a tropical vacation spot.

Furthermore, client device receives configuration file 477 from server 460, where configuration file 477 includes breakpoint 484. As discussed above, breakpoint 484 specifies screen size ranges for various client devices. Breakpoint 484 also specifies which type of client device supports each of the advertisements in supported advertisements 480.

Flowchart 500 also includes determining, using client capabilities and the configuration file, at least one advertisement from the supported advertisements to request (530). For example, once client device 410 receives supported advertisements 480 and configuration file 477 from server 460, processor 411 of client device 410 utilizes client capabilities 421 from memory 420 and configuration file 477 to determine at least one supported advertisement from supported advertisements 480 to request. In the implementation of FIG. 4, processor 411 executes client code 435 in memory 420.

Client code 435 uses client capabilities to determine a screen size of display 430. Next, using the screen size of display 430, client code 435 utilizes breakpoint 484 to determine which advertisements from supported advertisements 480 are supported on display 430. If client code 435 of client device 410 determines that at least one advertisement from supported advertisements 480 is supported by display 430, then client code 435 creates custom advertisement request 437 for the at least one advertisement from server 460.

In one implementation, processor 411 of client device 410 further receives advertisement design directions 485 from server 460. As discussed above, advertisement design directions 485 may specify the location of where each of the advertisements of supported advertisements 480 may be displayed on the webpage. For example, certain advertisements may be designed so that they are only supported near the top of the webpage, such as in a banner, while other advertisements are only supported near the end of the webpage. In such implementations where advertisement design directions 485 is also transmitted to client device 410 by server 460, client code 435 will further take into consideration advertisement design directions 485 when deciding which advertisements of supported advertisements 480 to request.

Flowchart 500 also includes creating a custom advertisement request for requesting the at least one advertisement from the server (540). For example, processor 411 of client device 410 executes client code 435 in memory 420 to create custom advertisement request 437, which requests the at least one advertisement determined to be supported from supported advertisements 480. As such, client device 410 executing client code 435 might determine that selected advertisement 434 is supported by display 430. Selected advertisement 434 may correspond to any of the advertisements from supported advertisements 480, such as advertisements 481-483. Processor 411 executing client code 435 may then create custom advertisement request 437, which requests selected advertisement 434.

Flowchart 500 also includes transmitting the custom advertisement request to the server (550). For example, processor 411 of client device 410 may transmit custom advertisement request 437 to server 460. As discussed above, custom advertisement request 437 requests selected advertisement 434 from server 460, which may correspond to any of advertisements 481-483. Flowchart 500 also includes receiving the at least one advertisement from the server (560). For example, processor 411 of client device 410 may receive selected advertisement 434 from server 460, which may be any one of supported advertisements 480, such as advertisements 481-483. Furthermore, as discussed above, in implementations where content database 462 is on a second server separate from server 460, processor 411 of client device 410 will transmit custom advertisement request 437 to the second server and receive selected advertisement 434 from the second server.

Flowchart 500 also includes writing the at least one advertisement on the webpage (570). For example, processor 411 of client device 410 may write selected advertisement 434 at advertisement location 433 on the webpage being accessed by client device 410.

Finally, flowchart 500 includes placing the at least one advertisement at an advertisement location on the webpage (580). For example, processor 411 of client device 410 may utilize client code 435 to locate advertisement location 433 on the webpage being accessed by web browser 431. Advertisement location 433 may correspond to a specified location of where selected advertisement 434 is to be displayed on the webpage. For example, in implementations where client device 410 receives advertisement design directions 485 from server 460, advertisement design directions 485 might specify that selected advertisement 434 must be displayed in the banner of the webpage.

It is noted that although flowchart 500 only illustrates one occurrence of a client device selecting an advertisement from a server, the disclosure is not limited to only one occurrence. For example, if a user of client device 410 alters client capabilities 421 by changing the screen configuration of display 430, such as by rotating client device 410 or varying the size of the browser in display 430, client device 410 will perform the method of flowchart 500 once again using the new configuration. As such, if the screen configuration of display 430 changes, client device 410 will determine if the advertisements being displayed on the webpage on display 430 are still supported by the new screen configuration using the method of flowchart 500. If client device 410 determines that the advertisements are still supported by the new screen configuration, then client device 410 will leave the advertisements in the current locations. However, if client device 410 determines that either the current location of an advertisement or the advertisement itself is not supported by the new screen configuration, then client device 410 can either move the location of the advertisement on the webpage, hide the advertisement from the webpage, or remove the advertisement from the webpage. Furthermore, client device 410 can decide that a new advertisement from supported advertisements 480 is now supported with the new screen configuration, and make a new request for that supported advertisement from server 460.

It should further be noted that the method of FIG. 5 only discusses the situation of when client device 410 determines that one of supported advertisements 480 should be requested, however, the method is not limited to client device 410 determining that one of supported advertisement 480 should be requested. For example, processor 411 of client device 410 may utilize client capabilities 421 from memory 420 and configuration file 477 to determine none of supported advertisements 480 are supported on client device 410. In such an example, client device 410 will not create and transmit custom advertisement request 437 to server 460. Furthermore, server 460 will not write and place any advertisements from supported advertisement 480 on the webpage being accessed by web browser 431.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a client device for client-side image selection on a webpage, the method comprising:
   requesting the webpage from a server;
   receiving an image tag and a configuration file from the server, wherein the image tag includes a reference to a transparent place image holder and data according to a real image, and wherein the configuration file includes a breakpoint;

determining, using the image tag and the configuration file, a selected image from a plurality of images using client capabilities, wherein each of the plurality of images is a same image with a different size or a different resolution than the selected image, wherein determining the selected image using the client capabilities includes determining a screen size for a display of the client device and selecting the selected image using the screen size according to the breakpoint;

creating an image handle to request the selected image;

transmitting the image handle to the server; and receiving the selected image from the server.

2. The method of claim 1, further comprising loading the selected image on the webpage.

3. The method of claim 1, further comprising receiving image design directions from the server, wherein determining the selected image further includes using the image design directions.

4. The method of claim 1, wherein the client capabilities include at least one of a type of the client device, a screen size for a display of the client device, an orientation of the display, a resolution of the display, and bandwidth capabilities of the client device.

5. The method of claim 1, wherein the webpage is requested by the client device using a web browser.

6. The method of claim 1, wherein the configuration file allows for image sizing and design direction to be controlled on at least one of a per page, module, breakpoint, and image direction basis.

7. A method for use by a server storing a plurality of images for providing client-side image selection on a webpage, the method comprising:

receiving a request from a client device to access the webpage;

transmitting an image tag and a configuration file to the client device wherein the image tag includes a reference to a transparent place image holder and data according to a real image, and wherein the configuration file includes a breakpoint;

receiving an image handle from the client device, the image handle requesting a selected image from the plurality of images, the selected image being determined using the image tag, the configuration file and client capabilities, wherein using the client capabilities includes determining a screen size for a display of the client device and selecting the selected image using the screen size according to the breakpoint, and wherein each of the plurality of images is a same image with a different size or a different resolution than the selected image; and transmitting the selected image to the client device.

8. The method of claim 7, further comprising transmitting image design directions to the client device.

9. The method of claim 7, wherein the configuration file allows for image sizing and design direction to be controlled on at least one of a per page, module, breakpoint, and image direction basis.

10. The method of claim 7, wherein the image tag includes a reference to a transparent place image holder.

11. The method of claim 7, further comprising retrieving the selected image from a content database in response to receiving the image handle.

12. The method of claim 7, wherein the configuration file, the image tag, and the selected image are transmitted to the client device over a network.

13. A method for use by a client device for client-side advertisement selection, the method comprising:

requesting a webpage from a server;

receiving, in response to requesting the webpage, supported advertisements and a configuration from the server, wherein the configuration file includes a breakpoint;

determining at least one advertisement from the supported advertisements using client capabilities and the configuration file, wherein each of the supported advertisements is for a different screen size or a different screen resolution than the at least one advertisement, wherein determining the at least one advertisement includes determining a screen size for a display of the client device and selecting the at least one advertisement using the screen size according to the breakpoint;

creating an advertisement request for the at least one advertisement;

transmitting the advertisement request to the server; and receiving the at least one advertisement from the server.

14. The method of claim 13, further comprising writing the at least one advertisement on the webpage.

15. The method of claim 13, further comprising receiving design directions from the server, wherein determining at least one advertisement further includes using the design directions.

16. The method of claim 13, wherein the supported advertisements includes an identity for each of a plurality of advertisements that the webpage can support on the client device.

17. The method of claim 13, wherein the client capabilities include at least one of a type of the client device, a screen size for a display of the client device, an orientation of the display, a resolution of the display, and bandwidth capabilities of the client device.

18. The method of claim 13, wherein the webpage is requested by the client device using a web browser.

* * * * *